(12) United States Patent
Zhu (10) Patent No.: US 9,597,638 B2
(45) Date of Patent: Mar. 21, 2017

(54) MEMBRANE SEAWATER DESALINATION PRESSURIZATION AND ENERGY RECOVERY INTEGRATED METHOD AND DEVICE

(76) Inventor: Ronghui Zhu, Beijing (CN)

(*) Notice: Subject to any disclaimer, the term of this patent is extended or adjusted under 35 U.S.C. 154(b) by 178 days.

(21) Appl. No.: 14/419,174

(22) PCT Filed: Sep. 4, 2012

(86) PCT No.: PCT/CN2012/080956
§ 371 (c)(1),
(2), (4) Date: May 7, 2015

(87) PCT Pub. No.: WO2014/019272
PCT Pub. Date: Feb. 6, 2014

(65) Prior Publication Data
US 2015/0298062 A1     Oct. 22, 2015

(30) Foreign Application Priority Data

Jul. 31, 2012   (CN) .......................... 2012 1 0270447

(51) Int. Cl.
*B01D 61/06* (2006.01)
*B01D 61/12* (2006.01)
(Continued)

(52) U.S. Cl.
CPC ........... *B01D 61/06* (2013.01); *B01D 61/025* (2013.01); *B01D 61/12* (2013.01); *C02F 1/441* (2013.01);
(Continued)

(58) Field of Classification Search
None
See application file for complete search history.

(56) References Cited

U.S. PATENT DOCUMENTS 6,017,200 A * 1/2000 Childs .................... B01D 61/06
                                                      417/390
6,470,683 B1 * 10/2002 Childs .................. B01D 61/025
                                                      60/39.6
(Continued)

FOREIGN PATENT DOCUMENTS

CN      101254407 A      9/2008
CN      101581328        11/2009
(Continued)

OTHER PUBLICATIONS

IPER—International Preliminary Examination Report, Feb. 27, 2015.*
(Continued)

*Primary Examiner* — Krishnan S Menon
(74) *Attorney, Agent, or Firm* — Clement Cheng (57) ABSTRACT

A membrane seawater desalination pressurization and energy recovery integrated method. Piston rods of single-rod piston-type seawater cylinders are connected with single-rod piston-type hydraulic cylinders to form two or more than two working combined bodies which operate alternately. In a process that the hydraulic cylinders drive the seawater cylinders to move back and forth, one piston cavity of a seawater cylinder sucks high pressure condensed brine in the process of moving forward and drains the high pressure condensed brine in the returning process; and the other piston cavity of the seawater cylinder sucks raw seawater in the returning process, pressurizes the raw seawater in the process of moving forward and continuously and stably outputs the pressurized high pressure raw seawater to a reverse osmosis membrane module. Meanwhile, a membrane seawater desalination pressurization and energy recovery integrated device is further disclosed.

14 Claims, 3 Drawing Sheets

(51) Int. Cl.
  *C02F 1/44*    (2006.01)
  *B01D 61/02*   (2006.01)
  *C02F 103/08*  (2006.01)
  *C02F 101/10*  (2006.01)

(52) U.S. Cl.
  CPC .... *B01D 2311/14* (2013.01); *B01D 2313/243* (2013.01); *C02F 2101/10* (2013.01); *C02F 2103/08* (2013.01); *C02F 2209/03* (2013.01); *C02F 2303/10* (2013.01); *Y02W 10/30* (2015.05)

(56) References Cited

U.S. PATENT DOCUMENTS 6,652,741 B1 * 11/2003 Marinzet ................ F04B 9/113
                                                   210/101
2011/0062063 A1   3/2011 Takahasi et al.

FOREIGN PATENT DOCUMENTS

| CN | 102838186 A | 12/2012 | |
|---|---|---|---|
| CN | 202808438 | 3/2013 | |
| DE | 2448985 A1 | 4/1976 | |
| FR | WO 0077397 A1 * | 12/2000 | ............ B01D 61/06 |
| JP | 2003-144856 A | 5/2003 | |
| JP | 2010-253343 A | 11/2010 | |
| JP | 2009103812 | 11/2010 | |

OTHER PUBLICATIONS

International Search Report in International Application No. PCT/CN2012/080956, filed Sep. 4, 2012.

* cited by examiner

MEMBRANE SEAWATER DESALINATION PRESSURIZATION AND ENERGY RECOVERY INTEGRATED METHOD AND DEVICE

TECHNICAL FIELD

The present invention relates to a high-pressure pump, an energy recovery device and a booster pump required for a reverse osmosis membrane seawater desalination, and particularly, to a device integrated with the high-pressure pump, the booster pump and the energy recovery system.

BACKGROUND

Seawater desalination is one of the methods for solving the global scarcity of freshwater resources, usually including a thermal method and a membrane method. In which, the membrane seawater desalination technology using the reverse osmosis membrane is widely used due to the low cost and power consumption, and gradually becomes predominant.

In the seawater desalination system, the preprocessed seawater having a lower salt content and entering the desalination system is raw seawater, which forms high-pressure raw seawater after being pressurized. One part of the high-pressure raw seawater passes through the reverse osmosis membrane module and becomes low-pressure freshwater, the other part is high-pressure condensed brine which is turned into low-pressure condensed brine after releasing pressure energy through the energy recovery device and then discharged.

The technology includes three core components: a reverse osmosis membrane, a high-pressure pump and an energy recovery device. The high-pressure pump increases the pressure of the raw seawater to 5-7 Mpa so that the freshwater of a proportion of about 40% passes through the reverse osmosis membrane. The remained condensed brine of a proportion of about 60% still has a pressure potential energy of about 6 Mpa, and it shall be transferred into the raw seawater through the energy recovery system to reduce the total energy consumption.

The key of the technology is how to reduce the investment cost, operation cost and energy consumption of the high-pressure pump and the energy recovery device. The sum of the costs of the high-pressure pump and the energy recovery device is about ⅓ of the total investment cost, their power consumptions are more than ⅔ of the total power consumption, and the power consumption costs occupy more than ⅓ of the operation cost. At present, the power consumption of freshwater generated in the method is 3-5 kwh/ton, while the limit power consumption under the current technological level of the membrane shall be 2.5 kwh/t, and there is still ⅓ energy saving space.

Currently, there are two types of high-pressure sea water pumps for seawater desalination: one is a piston type, which converts the power of motor rotation into a linear motion of the piston in the columnar cylinder block through a crank-link mechanism to pressure seawater; the structure achieves a high efficiency and the pump efficiency is more than 80%; but the flow is not stable enough and the pressure fluctuation is obvious; It is controlled by valves and the flow quantity is limited by the length of the crank link, thus the flow direction change is frequent, the vibration and noise are large, and the fault rates of the control valve and the sealing element are high. The other is a centrifugal pump which increases the water pressure through a centrifugal force generated by multi-stage rotor rotation; the flow is high and stable without requiring any valve control; but the efficiency is lower, and the pump efficiency is usually below 80% and averagely about 75%. Since the seawater is highly corrosive and lowly viscous, the support and flow passage components of the two types of pumps both shall be made of high-quality anti-corrosion and wear resistant material, such as copper alloy, duplex steel and even ceramic material, and their costs are very high.

Currently, there are also two types of energy recovery devices for seawater desalination: one is based on the principle of water turbine, wherein the high-pressure condensed brine drives the turbine to rotate to pressurize the raw seawater, without requiring a flow distribution control or a booster pump, and the flow is stable and continuous; But it needs two conversions, i.e., concentrated seawater pressure potential energy→shaft rotation mechanical energy→raw seawater pressure potential energy, thus the recovery efficiency is low and usually 60%, which has been gradually rejected by the industry. The other is based on the principle of pressure exchange, i.e., in the columnar cylinder block, the high-pressure condensed brine directly transfers the pressure potential energy to the raw seawater through a flow distribution mechanism; the transfer efficiency is very high and the energy recovery efficiency is more than 90%; Depending on the flow distribution manner, there is a rotary cylinder block with end port flow distribution structure without a piston energy recovery device and a fixed cylinder block valve controlled flow distribution structure with or without a piston energy recovery device; As for the rotary cylinder block without a piston energy recovery device (e.g., the PX series products of an American company), it is a simple structure but having a 2-5% mixing between the raw seawater and the condensed brine, and an independent booster pump is needed. That decrease the total efficiency; As for the fixed cylinder block valve controlled flow distribution structure with a piston, it does not require a booster bump and the efficiency is a little higher, but the control mechanism is complex. Relevant patents and practice at home and abroad are all based on the above technical solutions.

Therefore, based on many years of relevant design and manufacturing experiences, the inventor proposes a membrane seawater desalination pressurization and energy recovery integrated method and device to overcome the defects of the prior art.

SUMMARY

The object of the present invention is to provide a reverse osmosis membrane seawater desalination pressurization and energy recovery integrated method and device of low cost, high efficiency and high reliability.

The object of the present invention is achieved as follows: a membrane seawater desalination pressurization and energy recovery integrated method, wherein piston rods of single-rod piston-type seawater cylinders are connected to single-rod piston-type hydraulic cylinders to form two or more working combined bodies which operate alternately; one stroke is a forward stroke when the piston rods of the hydraulic cylinders protrude from a cylinder block, and a return stroke when the piston rods retract; in a process that the hydraulic cylinders drive the seawater cylinders to move back and forth, one piston chamber with rod of the seawater cylinder sucks high-pressure condensed brine output from a reverse osmosis membrane module in the forward stroke and drains in the return stroke; and the other rod-less piston chamber of the seawater cylinder sucks raw seawater in the return stroke, and pressurizes and outputs the raw seawater in the forward stroke; thus, the raw seawater is pressurized by adding up a high-pressure hydraulic driving force of the hydraulic cylinders with a pressure of the high-pressure condensed brine; and the pressurized high-pressure raw seawater is continuously and stably output to the reverse osmosis membrane module through a hydraulic accumulator and/or a constant flow control.

In a preferred embodiment of the present invention, the seawater cylinder is connected to the hydraulic cylinder in such a manner that the piston rod of the seawater cylinder is connected to the piston rod of the hydraulic cylinder; or the piston rod of the seawater cylinder is connected to the cylinder block of the hydraulic cylinder.

According to the above method, the present invention further proposes a membrane seawater desalination pressurization and energy recovery integrated device, comprising a first hydraulic cylinder, a second hydraulic cylinder, a first seawater cylinder and a second seawater cylinder which are all single-rod piston cylinders; the first hydraulic cylinder is connected to a piston rod of the first seawater cylinder to form a first working combined body; the second hydraulic cylinder is connected to a piston rod of the second seawater cylinder to form a second working combined body; rod-less chambers of the first hydraulic cylinder and the second hydraulic cylinder are connected to a forward stroke hydraulic power unit through a forward stroke direction control valve; rod chambers of the first hydraulic cylinder and the second hydraulic cylinder are connected to a return stroke hydraulic power unit through a return stroke direction control valve; rod chambers of the first seawater cylinder and the second seawater cylinder are connected to a high-pressure condensed brine pipeline or a low-pressure condensed brine pipeline through an energy recovery direction control valve; the rod-less chambers of the first seawater cylinder and the second seawater cylinder are connected to a high-pressure raw seawater pipeline through an input check valve, respectively, and connected to raw seawater supply pipeline through an output check valve, respectively; the high-pressure raw seawater pipeline is provided with a hydraulic accumulator; the pressurization and energy recovery integrated device further comprises a system control unit at least composed of a controller, a hydraulic pressure sensor provided in a hydraulic circuit, a water pressure sensor provided in the high-pressure raw seawater pipeline, and a plurality of piston position sensors; the control unit controls the switching and coordination between the forward stroke direction control valve, the return stroke direction control valve and the energy recovery direction control valve according to a system load requirement, position signals provided by the piston rod position sensors and signals from respective pressure sensors; the forward stroke direction control valve and the return stroke direction control valve act in coordination with each other to control the first working combined body and the second working combined body in a moving state where a forward stroke that the piston rods of the hydraulic cylinders protrude outwards relative to the cylinder blocks and a return stroke that the piston rods of the hydraulic cylinders retract inwards relative to the cylinder blocks are periodically and alternately; the energy recovery direction control valve controls the chamber with piston rod of the seawater cylinder in the forward stroke to be communicated with the high-pressure condensed brine pipeline, and the chamber with piston rod of the seawater cylinder in the return stroke to be communicated with the low-pressure condensed brine pipeline; and the controller controls pressures and flows output from the forward stroke hydraulic power unit and the return stroke hydraulic power unit, so as to achieve a given amount of freshwater.

In a preferred embodiment of the present invention, the piston rod of the first hydraulic cylinder is connected to the piston rod of the first seawater cylinder to form the first working combined body; and the piston rod of the second hydraulic cylinder is connected to the piston rod of the second seawater cylinder to form the second working combined body.

In a preferred embodiment of the present invention, the rod-less chambers of the two hydraulic cylinders are a first forward stroke chamber and a second forward stroke chamber, respectively; the rod chambers of the two hydraulic cylinders are a first return stroke chamber and a second return stroke chamber, respectively; the rod-less chambers of the two seawater cylinders are a first pressurizing chamber and a second pressurizing chamber, respectively; the rod chambers of the two seawater cylinders are a first energy recovery chamber and a second energy recovery chamber, respectively; a ratio of cross-sectional areas of the energy recovery chambers of the seawater cylinders to cross-sectional areas of the pressurizing chambers is 1-k; a ratio of cross-sectional areas of the forward stroke chambers of the hydraulic cylinders to cross-sectional areas of the pressurizing chambers of the seawater cylinders is ko×k×Ps/Ph; wherein Ps is a pressure required for the normal work of the reverse osmosis membrane, Ph is an output oil pressure of the hydraulic power unit, ko is a safety coefficient larger than 1, and k is a freshwater produce rate of a seawater desalination reverse osmosis membrane system.

In a preferred embodiment of the present invention, the forward stroke direction control valve is a two-position four-way direction valve or a three-position four-way direction valve, which is electro-magnetically controlled or electro-hydraulically controlled; an oil inlet of the forward stroke direction control valve is connected to an oil outlet of the forward stroke hydraulic power unit; an oil return port of the forward stroke direction control valve is connected to an oil return port of the forward stroke hydraulic power unit; two working oil ports of the forward stroke direction control valve are connected to the forward stroke chambers of the first hydraulic cylinder and the second hydraulic cylinder, respectively.

In a preferred embodiment of the present invention, the return stroke direction control valve is a two-position four-way direction valve or a three-position four-way direction valve, which is electromagnetically controlled or electro-hydraulically controlled; an oil inlet of the return stroke direction control valve is connected to an oil outlet of the return stroke hydraulic power unit; an oil return port of the return stroke direction control valve is connected to an oil return port of the return stroke hydraulic power unit; two working oil ports of the return stroke direction control valve are connected to the return stroke chambers of the first hydraulic cylinder and the second hydraulic cylinder, respectively.

In a preferred embodiment of the present invention, the energy recovery direction control valve is a two-position four-way seawater distribution valve or a three-position four-way seawater distribution valve, which is electromagnetically controlled or electro-hydraulically controlled; a fluid inlet of the energy recovery direction control valve is connected to a high-pressure condensed brine pipeline from a reverse osmosis membrane module; a fluid return port of the energy recovery direction control valve is connected to a low-pressure condensed brine pipeline of the system; two working fluid ports of the energy recovery direction control valve are connected to the energy recovery chambers of the first seawater cylinder and the second seawater cylinder, respectively; the energy recovery direction control valve controls the energy recovery chamber of the seawater cylinder in a forward stroke to be communicated with the high-pressure condensed brine pipeline, and the energy recovery chamber of the seawater cylinder in a return stroke to be communicated with the low-pressure condensed brine discharging pipeline of the system.

In a preferred embodiment of the present invention, each of the forward stroke direction control valve, the return stroke direction control valve and the energy recovery direction control valve is a slide valve, a rotary valve or a logical control valve group composed of a plurality of cartridge valves.

In a preferred embodiment of the present invention, each of the forward stroke direction control valve, the return stroke direction control valve and the energy recovery direction control valve has a direction-change buffering function and a neutral position transition mechanism.

In a preferred embodiment of the present invention, the forward stroke hydraulic power unit is composed of a prime mover, a high-pressure hydraulic pump and an auxiliary device; and the forward stroke hydraulic power unit provides a high-pressure hydraulic power oil source to the first hydraulic cylinder and the second hydraulic cylinder, and drives the piston rod to perform a forward stroke motion that protrudes outwards.

In a preferred embodiment of the present invention, the prime mover of the forward stroke hydraulic power unit is an electric motor, an internal combustion engine or other common power unit; the high-pressure hydraulic pump is a fixed displacement pump or a hydraulic variable displacement pump, and preferably an axial plunger pump or a vane pump.

In a preferred embodiment of the present invention, the return stroke hydraulic power unit is composed of a prime mover, a lower pressure hydraulic pump and an auxiliary device; and the return stroke hydraulic power unit provides a lower pressure hydraulic power oil source to the first hydraulic cylinder and the second hydraulic cylinder, and drives the piston rod to perform a return stroke motion that retracts inwards.

In a preferred embodiment of the present invention, the prime mover of the return stroke hydraulic power unit is an electric motor, an internal combustion engine or other common power unit, or shares the prime mover of the forward stroke hydraulic power unit.

In a preferred embodiment of the present invention, the auxiliary device in the hydraulic power unit comprises a hydraulic oil tank, a cooler, a filter, a pressure adjustable electric control overflow valve, a hydraulic accumulator, a pressure sensor or a pressure gage, a temperature sensor or a temperature gauge, a fluid level sensor or a fluid level indicator, a connection pipeline and a valve.

In a preferred embodiment of the present invention, the first hydraulic cylinder and the second hydraulic cylinder are provided with a mechanical or electric control buffer device.

In a preferred embodiment of the present invention, the cylinder blocks, the pistons, and the piston rods of the first seawater cylinder and the second seawater cylinder are made of materials resistant to seawater corrosion; the cylinder blocks are made of duplex stainless steel or glass fiber reinforced plastics composite material; and the piston and the piston rod are made of duplex stainless steel or corrosion resistant copper alloy material.

In a preferred embodiment of the present invention, the hydraulic accumulator is made of a material resistant to seawater corrosion, and preferably a bag type accumulator.

In a preferred embodiment of the present invention, the control unit implements the following basic process control: the system control unit adjusts an output pressure and flow of the forward stroke hydraulic power unit according to the system load requirement; the output high-pressure hydraulic oil enters the forward stroke chamber of the first hydraulic cylinder through the forward stroke direction control valve, and drives the piston rod of the first hydraulic cylinder to pressurize the piston and the piston rod of the first seawater cylinder; meanwhile, the high-pressure condensed brine enters the energy recovery chamber of the first seawater cylinder through the energy recovery direction control valve, and also pressurizes the piston of the first seawater cylinder; a high-pressure hydraulic driving force and a pressure of the high-pressure condensed brine add up with each other and together drive the piston of the first seawater cylinder to move, so as to increase the pressure of the raw seawater in the pressurizing chamber of the first seawater cylinder, and compel the raw seawater into the high-pressure raw seawater pipeline through the input check valve so that it enters a reverse osmosis membrane module; At the same time, the lower pressure hydraulic oil output from the return stroke hydraulic power unit enters the second hydraulic cylinder's return chamber through the return stroke direction control valve, the system control unit adjusts the pressure and flow of the return stroke hydraulic power unit and drives the piston of the second hydraulic cylinder to return quickly, thereby moving the piston of the second seawater cylinder, the pressurizing chamber of the second seawater cylinder sucks the raw seawater through the output check valve, the energy recovery chamber of the second seawater cylinder discharges the condensed brine after working through the energy recovery direction control valve, and simultaneously discharges the hydraulic oil after working in the forward stroke chamber of the second hydraulic cylinder through the forward stroke direction control valve, and the piston of the second hydraulic cylinder returns to a start point of the second hydraulic cylinder before the piston of the first hydraulic cylinder reaches a working end point; when the working stroke of the first hydraulic cylinder reaches the end point, the system control unit instructs the return stroke direction control valve, the forward stroke direction control valve and the energy recovery direction control valve to change positions, and the second hydraulic cylinder and the second seawater cylinder to interchange working mechanisms with the first hydraulic cylinder and the first seawater cylinder; these actions circulate and repeat to complete the works of pressurization and energy recovery required for seawater desalination.

In a preferred embodiment of the present invention, the control unit implements the following constant flow process control at high pressure part: the system control unit adjusts an output pressure and flow of the forward stroke hydraulic power unit according to a system load requirement, the output high-pressure hydraulic oil enters the forward stroke chamber of the first hydraulic cylinder through the forward stroke direction control valve, and drives the piston rod of the first hydraulic cylinder to pressurize the piston and the piston rod of the first seawater cylinder; meanwhile, the high-pressure condensed brine enters the energy recovery chamber of the first seawater cylinder through the energy recovery direction control valve, and also pressurizes the piston of the first seawater cylinder, and a high-pressure hydraulic driving force and a pressure of the high-pressure condensed brine add up with each other and together drive the piston of the first seawater cylinder to move, so as to increase the pressure of the raw seawater in the pressurizing chamber of the first seawater cylinder, and compel the raw seawater into the high-pressure raw seawater pipeline through the input check valve so that it enters a reverse osmosis membrane module; at the same time, the lower pressure hydraulic oil output from the return stroke hydraulic power unit enters the second hydraulic cylinder through the return stroke direction control valve, the system control unit adjusts the pressure and flow of the return stroke hydraulic power unit and drives the piston of the second hydraulic cylinder to return quickly, thereby moving the piston of the second seawater cylinder, the pressurizing chamber of the second seawater cylinder sucks the raw seawater through the output check valve, the energy recovery chamber of the second seawater cylinder discharges the condensed brine after working through the energy recovery direction control valve, and simultaneously discharges the hydraulic oil after working in the forward stroke chamber of the second hydraulic cylinder through the forward stroke direction control valve and the piston of the second hydraulic cylinder returns to a start point of the second hydraulic cylinder before the piston of the first hydraulic cylinder reaches a working end point, the system control unit instructs the return stroke direction control valve to enter a neutral position, the forward stroke direction control valve also synchronously switches to the neutral position, distributes the high-pressure hydraulic oil to the first hydraulic cylinder and the second hydraulic cylinder simultaneously and causes the flow entering the forward stroke chamber of the first hydraulic cylinder to gradually decrease, the flow entering the forward stroke chamber of the second hydraulic cylinder to gradually increase, and the sum of the flow entering the forward stroke chamber of the first hydraulic cylinder and the flow entering the forward stroke chamber of the second hydraulic cylinder to be constant; correspondingly, the energy recovery direction control valve also switches to the neutral position to cause the flow of the high-pressure condensed brine entering the energy recovery chamber of the first seawater cylinder to gradually decrease, and the flow of the high-pressure condensed brine entering the energy recovery chamber of the second seawater cylinder to gradually increase, thus under the hydraulic pressure and the pressure of the recovered high-pressure condensed brine, the two working combined bodies ensure that the flow of the high-pressure raw seawater output from the seawater pressurizing chamber of the second seawater cylinder gradually increases while the flow of the high-pressure raw seawater output from the seawater pressurizing chamber of the first seawater cylinder gradually decreases, and the sum of the flows of the high-pressure raw seawater flowing out of them is constant, so as to achieve a continuous and stable output of the high-pressure raw seawater to a reverse osmosis membrane module; when a working stroke of the first hydraulic cylinder reaches an end point, the system control unit instructs the return stroke direction control valve, the forward stroke direction control valve and the energy recovery direction control valve to change positions, and the second hydraulic cylinder and the second seawater cylinder to interchange the working mechanisms with the first hydraulic cylinder and the first seawater cylinder; and these actions circulate and repeat to complete the works of pressurization and energy recovery required for seawater desalination.

As described above, the present invention simultaneously achieves the three functions of the high-pressure seawater pump, the energy recovery device and the booster device through a pair of hydraulic and seawater piston cylinders, supplements the energy required for seawater desalination through a hydraulic drive, and recovers the pressure energy through a fluid-fluid exchange. As compared with the most advanced seawater desalination system at present which is composed of a high-pressure seawater pump, a pressure exchange energy recovery device and a booster pump, the present invention structurally reserves the pressure exchange energy recovery device and enables it to pressurize all the raw seawater, and replaces the system which is composed of a high-pressure seawater pump and a seawater booster pump with a hydraulic system which is composed of a high-pressure hydraulic pump and a hydraulic cylinder. Therefore, the following beneficial effects are produced:

1. The system initial investment cost is greatly reduced:

The high-pressure pump, oil cylinder, control pump, etc. used by the hydraulic system are all made of steel or cast iron, and they are mature products which can be industrially produced on a large scale with cheaper prices. But the conventional high-pressure seawater pump shall be made of corrosion and wear resistant expensive metal, such as duplex stainless steel, aluminum bronze, ceramic material, etc., thus the machining is difficult and the material price is high. The cost of the conventional high-pressure seawater pump system is several times of that of the present hydraulic pressurizing system of the same power. Meanwhile, due to the highly integration of the pressurizing and energy recovery functions, many connection pipelines and valves in the conventional system are saved, and the pipeline engineering and material cost are greatly decreased. In addition, the floor space and the construction cost of infrastructure including workshops are also reduced.

2. The system efficiency is increased:

In the system of the present invention, the energy recovery system and the advanced pressure exchange system have the same principle and efficiency. But regarding the high-pressure pump, the efficiency of the plunger high-pressure seawater pump is about 80%, and the efficiency of the multi-stage centrifugal high-pressure seawater pump is about 78%; in the system of the present invention, since the pressures in the two chambers of the seawater cylinder are basically balanced, the volume efficiency and the mechanical efficiency in the seawater pressurizing process are very high, and the efficiency of the high-pressure hydraulic pump (e.g., high-pressure axial plunger pump) is more than 90%. Even considering the valve control, the hydraulic cylinder efficiency and the pressure loss (1-2%) of the hydraulic oil circuit system, the total system efficiency can reach 85%, which is increased by at least 5-10%. Correspondingly, the electric power consumption, i.e., the operation cost, can be reduced.

3. The system reliability is improved:

The present invention omits the high-pressure seawater pump of high failure rate and short service life; while the hydraulic system is relatively mature, which has a low failure rate, and the service life is also long in a seawater desalination system where the load is relatively stable. Comparing the present system with the plunger high-pressure seawater pump system of a high efficiency, the flow of the mechanical plunger seawater pump fluctuates obviously and the piston stroke is limited. In order to obtain a large seawater flow, the piston shall move back and forth in a high speed of 300-500 rpm, thus the hydraulic impact, the vibration and the noises are large, the moving parts may be quickly worn, and the valve group and sealing element are easily to be invalid. By contrast, the high-pressure seawater cylinder of the system has a long stroke, the reciprocating frequency may be decreased to be a fraction of that of the plunger pump, thus the flow of the high-pressure seawater is almost constant and the impact vibration is much smaller in combination with a pressure stabilization of the hydraulic accumulator performs and a special transition process control. As a result, the failure rate is certainly decreased, the service life of the system is increased, and the service life of the module is also prolonged. More importantly, the hydraulic system has a particular safety protection and buffer mechanism, which can protect the entire system including the membrane module from any damage caused by the high-pressure impact in case of accidents such as mis-operation.

4. The maintenance cost is low:

The body and the core of the high-pressure seawater pump have to be replaced when they are damaged by the corrosion and washing of seawater, while the core of the hydraulic oil pump can be repaired so that the maintenance cost is greatly reduced.

5. The system is well-adapted to unstable power sources and the load adjustment is flexible:

If the forward stroke hydraulic pump is a variable pump, the discharge variable range may be 10% to 100%, thus an adjustment can be made within a very wide load range and the efficiency does not change too much, which is difficult for other seawater desalination system. Because the output flow of either the centrifugal seawater pump or the plunger seawater pump is substantially constant, and the load can only be adjusted by shutting down a part of the machine set. The on-off control shall be performed once a day and the human workload is too high. Thus the present invention can bring two major advantages: one is that the system can be used in conjunction with unstable energy supply such as wind energy and solar energy to promote the application of new energy resources. The other is that the off-peak electricity at night can be used largely to reduce the daytime load, i.e., the grid load is adjusted with the freshwater storage in the seawater desalination, and the cost of the freshwater storage is very low. Regarding the industrial power price at present, the daytime power prices are variable at different places, and the average is about 1 CNY, while the off-peak electricity at night is about 0.35 CNY, which is ⅓ of the power price in the daytime. Therefore, the power consumption cost of the seawater desalination can be greatly reduced, and the energy usage efficiency of the operation of the whole electric power grid can also be improved.

BRIEF DESCRIPTION OF THE DRAWINGS

The following drawings only intend to exemplarily describe and explain the present invention, rather than limiting the scope of the present invention, in which.

DESCRIPTION OF THE EMBODIMENTS

In order to understand the technical features, object and effects of the present invention more clearly, the embodiments of the present invention are described with reference to the drawings.

The present invention proposes a membrane seawater desalination pressurization and energy recovery integrated method, wherein piston rods of single-rod piston-type seawater cylinders are in relatively fixed connection with piston rods of single-rod piston-type oil cylinders to form two or more working combined bodies which operate alternately; in a process that the oil cylinders drive the seawater cylinders to move back and forth, one piston chamber of the seawater cylinder sucks high-pressure condensed brine filtered by osmotic membranes in the forward stroke and drains in the return stroke; while the other piston chamber of the seawater cylinder sucks raw seawater in the return stroke, and pressurizes the raw seawater in the forward stroke; thus, the raw seawater is pressurized by adding up the high-pressure hydraulic driving force of the oil cylinder and the pressure of the high-pressure condensed brine, and the pressurized high-pressure raw seawater is continuously and stably output to a reverse osmosis membrane module.

Figure 1:
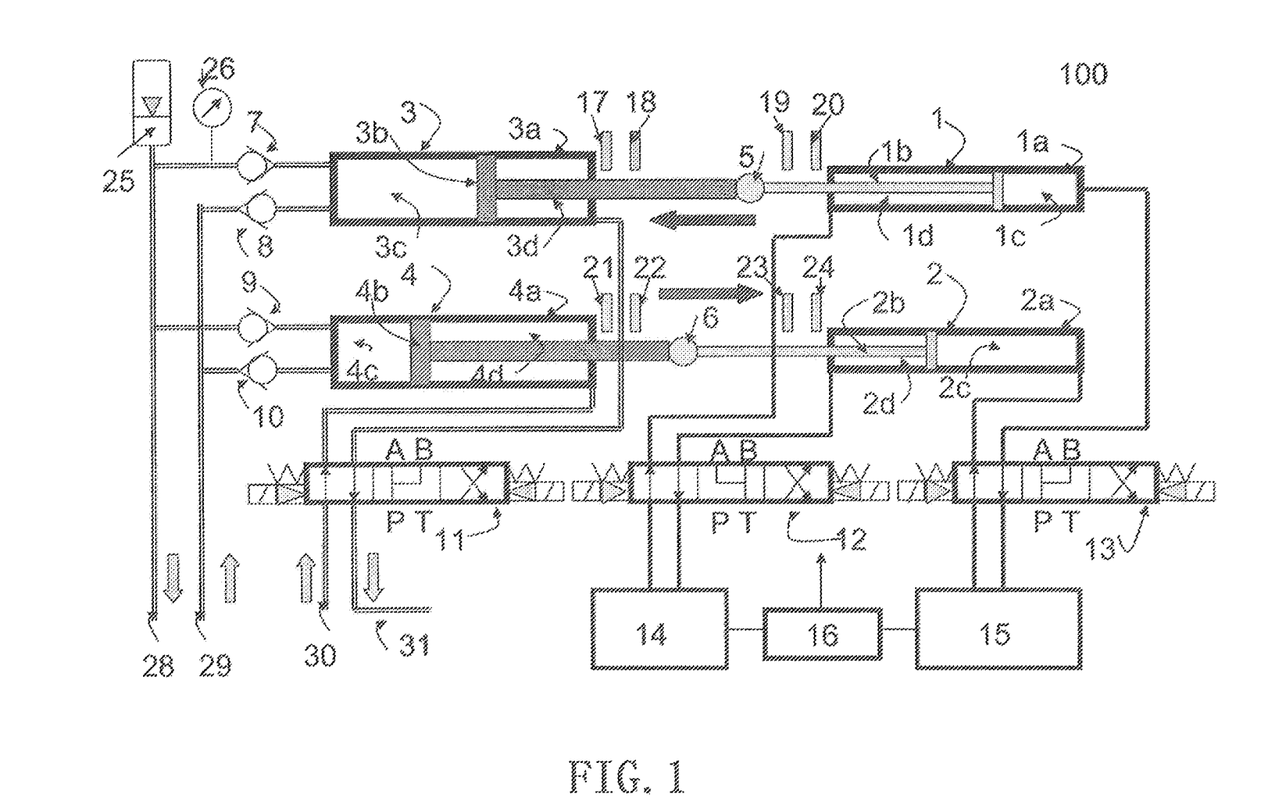
FIG. 1 is a system principle diagram of a membrane seawater desalination pressurization and energy recovery integrated device according to the present invention.
Figure 2:
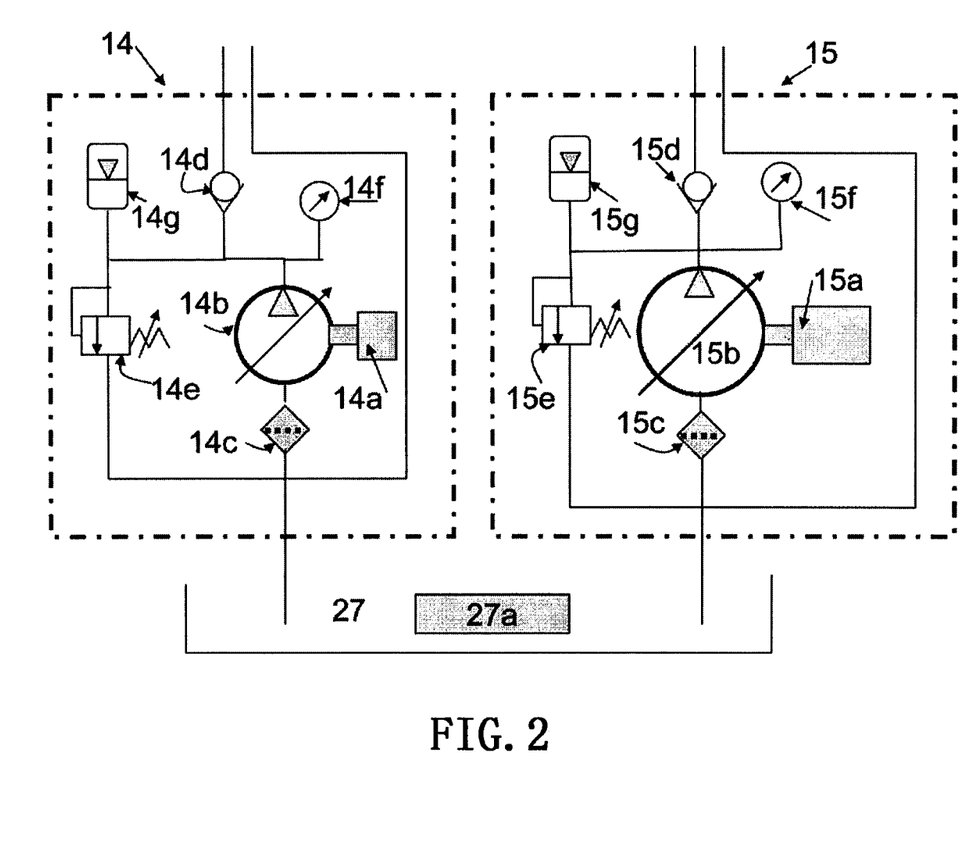
FIG. 2 is a structure diagram of a forward stroke hydraulic power unit and a return forward stroke hydraulic power unit according to the present invention.

As illustrated in FIGS. 1 and 2, according to the above method, the present invention further proposes a membrane seawater desalination pressurization and energy recovery integrated device 100, comprising a first hydraulic cylinder 1, a second hydraulic cylinder 2, a first seawater cylinder 3 and a second seawater cylinder 4 which are all single-rod piston cylinders; the first hydraulic cylinder 1 is composed of a cylinder body 1a (including left and right covers), a piston and a piston rod 1b; the second hydraulic cylinder 2 is composed of a cylinder body 2a (including left and right covers), a piston and a piston rod 2b; the piston partitions the volume of the hydraulic cylinder into left and right chambers; the rodless chambers of the two hydraulic cylinders are a first forward stroke chamber 1c and a second forward stroke chamber 2c, respectively; the rod chambers of the two hydraulic cylinders are a first return stroke chamber 1d and a second return stroke chamber 2d, respectively; the first seawater cylinder 3 is composed of a cylinder body 3a (including left and right covers), a piston and a piston rod 3b; the second seawater cylinder 4 is composed of a cylinder body 4a (including left and right covers), a piston and a piston rod 4b; the piston partitions the volume of the seawater cylinder into left and right chambers; the rodless chambers of the two seawater cylinders are a first pressurizing chamber 3c and a second pressurizing chamber 4c, respectively; the rod chambers of the two seawater cylinders are a first energy recovery chamber 3d and a second energy recovery chamber 4d, respectively; the piston rod 1b of the first hydraulic cylinder 1 is in relatively fixed connection with the piston rod 3b of the first seawater cylinder 3 through a connector 5, and the working stroke of the piston of the first hydraulic cylinder 1 is consistent with that of the piston of the first seawater cylinder 3, thereby forming a first working combined body; the piston rod 2b of the second hydraulic cylinder 2 is in relatively fixed connection with the piston rod 4b of the second seawater cylinder 4 through a connector 6, and the working stroke of the piston of the second hydraulic cylinder 2 is consistent with that of the piston of the second seawater cylinder 4, thereby forming a second working combined body; the forward stroke chambers 1c, 2c of the first hydraulic cylinder 1 and the second hydraulic cylinder 2 are connected to a forward stroke hydraulic power unit 15 through a forward stroke direction control valve 13; the return stroke chambers 1d, 2d of the first hydraulic cylinder 1 and the second hydraulic cylinder 2 are connected to a return stroke hydraulic power unit 14 through a return stroke direction control valve 12; the cover at either end of the hydraulic cylinder is provided with a general buffer device to prevent the piston from colliding with the cover when the direction is changed; the energy recovery chambers 3d, 4d of the first seawater cylinder 3 and the second seawater cylinder 4 are connected to a high-pressure condensed brine pipeline 30 or a low-pressure condensed brine pipeline 31 through an energy recovery direction control valve 11; the pressurizing chamber 3c of the first seawater cylinder 3 is connected to a high-pressure raw seawater pipeline 28 through an input check valve 7, and the pressurizing chamber 4c of the second seawater cylinder 4 is also connected to the high-pressure raw seawater pipeline 28 through another input check valve 9; meanwhile, the pressurizing chamber 3c of the first seawater cylinder 3 is also connected to a raw seawater supply pipeline 29 through an output check valve 8, and the pressurizing chamber 4c of the second seawater cylinder 4 is also connected to the raw seawater supply pipeline 29 through another output check valve 10; the high-pressure raw seawater pipeline 28 is provided with a hydraulic accumulator 25 to absorb any possible pressure impact and fluctuation in the high-pressure raw seawater pipeline 28, so as to protect the reverse osmosis membrane module; the pressurization and energy recovery integrated device 100 further comprises a system control unit at least composed of a controller 16, hydraulic pressure sensors 14f, 15f provided in a hydraulic circuit, a hydraulic pressure sensor 26 provided in the high-pressure raw seawater pipeline 28, and a plurality of piston position sensors 17, 18, 19, 20, 21, 22, 23, 24 provided in the piston rod round stroke; the control unit controls the switching and coordination between the forward stroke direction control valve 13, the return stroke direction control valve 12 and the energy recovery direction control valve 11 according to a system load requirement, positions signal provided by the piston rod position sensor sand signals from respective pressure sensors; the forward stroke direction control valve 13 and the return stroke direction control valve 12 act in coordination with each other to control the first working combined body and the second working combined body in a moving state where a forward stroke that the piston rod of the hydraulic cylinder protrudes outwards and a return stroke that the piston rod of the hydraulic cylinder retracts inwards are crossed and alternative; the energy recovery direction control valve 11 controls the energy recovery chamber of the seawater cylinder in the forward stroke to be communicated with the high-pressure condensed brine pipeline 30, and the energy recovery chamber of the seawater cylinder in the return stroke to be communicated with the low-pressure condensed brine pipeline 31; the controller 16 controls the pressures and flows output from the forward stroke hydraulic power unit 15 and the return stroke hydraulic power unit 14, so as to achieve the given amount of the freshwater.

As described above, the present invention simultaneously achieves the three functions of the high-pressure seawater pump, the energy recovery device and the booster device through a pair of seawater piston cylinders, supplements the energy required for seawater desalination through a hydraulic drive, and recovers the pressure energy through a liquid-liquid exchange. Therefore, the system cost is reduced and the system efficiency and reliability are improved.

Further, in this embodiment, a ratio of cross-sectional areas of the energy recovery chambers 3d, 4d of the seawater cylinders 3, 4 to cross-sectional areas of the pressurizing chambers 3c, 4c is 1-k; a ratio of cross-sectional areas of the forward stroke chambers 1c, 2c of the hydraulic cylinders 1, 2 to cross-sectional areas of the pressurizing chambers 3c, 4c of the seawater cylinders 3, 4 is ko×k×Ps/Ph; wherein Ps is a pressure required for the normal work of the reverse osmosis membrane, and is about 5-7 Mpa under the current technological level; Ph is an output oil pressure of the hydraulic power unit, which is selected based on different hydraulic pump characteristics and preferably 25-40 Mpa for the high-pressure axial plunger pump; ko is a coefficient slightly larger than 1, which is determined by mainly considering overcoming factors such as pipeline resistance loss, friction loss and leakage; k is a freshwater recovery rate of the seawater desalination reverse osmosis membrane system, and it is about 30-60% under the current technological level of the reverse osmosis membrane.

In this embodiment, as illustrated in FIG. 1, the forward stroke direction control valve 13 is a two-position four-way direction valve or a three-position four-way direction valve. The forward stroke direction control valve 13 is electromagnetically controlled or electrohydraulically controlled. The oil inlet P of the forward stroke direction control valve 13 is connected to an oil outlet of the forward stroke hydraulic power unit 15; an oil return port T of the forward stroke direction control valve 13 is connected to an oil return port of the forward stroke hydraulic power unit 15; two working oil ports A and B of the forward stroke direction control valve 13 are connected to the forward stroke chamber 1c of the first hydraulic cylinder and the forward stroke chamber 2c of the second hydraulic cylinder, respectively. The forward stroke direction control valve 13 may be a slide valve, a rotary valve or a logical control valve group composed of a plurality of cartridge valves; the forward stroke direction control valve 13 has a direction-change buffering adjustment function and a neutral position transition mechanism; the high-pressure oil inlet P is simultaneously communicated with the two working oil ports A and B at the neutral position, thus the constant flow function can be achieved and the direction-change impact can be reduced.

As illustrated in FIG. 1, the return stroke direction control valve 12 is also a two-position four-way direction valve or a three-position four-way direction valve. The return stroke direction control valve 12 is also electromagnetically controlled or electrohydraulically controlled. The oil inlet P of the return stroke direction control valve 12 is connected to an oil outlet of the return stroke hydraulic power unit 14; an oil return port T of the return stroke direction control valve 12 is connected to an oil return port of the return stroke hydraulic power unit 14; two working oil ports A and B of the return stroke direction control valve 12 are connected to the return stroke chamber 1d of the first hydraulic cylinder and the return stroke chamber 2d of the second hydraulic cylinder, respectively. The return stroke direction control valve 12 may be a slide valve, a rotary valve or a logical control valve group composed of a plurality of cartridge valves. The return stroke direction control valve 12 has a direction-change buffering adjustment function and a neutral position transition mechanism; the oil return port T is simultaneously communicated with the two working oil ports A and B at the neutral position, thus the accuracy of return speed adjustment can be decreased and the direction-change impact can be reduced.

As illustrated in FIG. 1, the energy recovery direction control valve 11 is a two-position four-way seawater distribution valve or a three-position four-way seawater distribution valve. The energy recovery direction control valve 11 is electromagnetically controlled or electrohydraulically controlled. The liquid inlet P of the energy recovery direction control valve 11 is connected to the high-pressure condensed brine pipeline 30 from the reverse osmosis membrane module; a liquid return port T of the energy recovery direction control valve 11 is connected to the low-pressure condensed brine pipeline 31 of the system; two working liquid ports A and B of the energy recovery direction control valve 11 are connected to the energy recovery chamber 3d of the first seawater cylinder and the energy recovery chamber 4d of the second seawater cylinder, respectively. The energy recovery direction control valve 11 controls the energy recovery chamber of the seawater cylinder in the forward stroke to be communicated with the high-pressure condensed brine pipeline 30, and the energy recovery chamber of the seawater cylinder in the return stroke to be communicated with the low-pressure condensed brine pipeline 31 of the system. The energy recovery direction control valve 11 may be a slide valve, a rotary valve or a logical control valve group composed of a plurality of cartridge valves; the energy recovery direction control valve 11 may have a neutral position transition mechanism, wherein the high-pressure liquid inlet P is simultaneously communicated with the two working liquid ports A and B at the neutral position to achieve the constant flow function.

Further, in this embodiment, as illustrated in FIGS. 1 and 2, the forward stroke hydraulic power unit 15 is composed of a prime mover 15a, a high-pressure hydraulic pump 15b and an auxiliary device. The forward stroke hydraulic power unit 15 provides a high-pressure hydraulic power oil source to the first hydraulic cylinder 1 and the second hydraulic cylinder 2, and drives the piston rod to perform a forward motion that protrudes outwards. The prime mover 15a of the forward stroke hydraulic power unit 15 may be an electric motor, an internal combustion engine or other common power unit. The high-pressure hydraulic pump 15b is a metering pump or a hydraulic variable pump, and preferably an axial plunger pump or a vane pump. The auxiliary device includes a hydraulic oil tank 27, a cooler 27a, a filter 15c, a pressure adjustable electric control overflow valve 15e, a hydraulic accumulator 15g, a pressure sensor or a pressure gage 15f, a temperature sensor or a temperature gauge, a liquid level sensor or a liquid level indicator, a connection pipeline and an input check valve 15d provided on the oil outlet. Since the hydraulic oil flow fluctuates largely in the working process, the hydraulic accumulator 15g is provided for an adjustment.

The return stroke hydraulic power unit 14 is composed of a prime mover 14a, a low-pressure hydraulic pump 14b and an auxiliary device. The return stroke hydraulic power unit 14 provides a low-pressure hydraulic power oil source to the first hydraulic cylinder 1 and the second hydraulic cylinder 2, and drives the piston rod to perform a return motion that retracts inwards. The prime mover 14a of the return stroke hydraulic power unit 14 may be an electric motor, an internal combustion engine or other common power unit (it also may be considered to share the prime mover 15a of the forward stroke hydraulic power unit 15). The power of the prime mover 14a may be less than that of the prime mover 15a, and the flow of the low-pressure hydraulic pump 14b may be less than that of the high-pressure hydraulic pump 15b. The auxiliary device includes a hydraulic oil tank 27, a cooler 27a, a filter 14c, a pressure adjustable electric control overflow valve 14e, a hydraulic accumulator 14g, a pressure sensor or a pressure gage 14f, a temperature sensor or a temperature gauge, a liquid level sensor or a liquid level indicator, a connection pipeline and an input check valve 14d provided on the oil outlet. Since the hydraulic oil flow fluctuates largely in the working process, the hydraulic accumulator 14g is provided for an adjustment In this embodiment, the cylinder blocks 3a, 4a, the pistons, and the piston rods 3b, 4b of the first seawater cylinder 3 and the second seawater cylinder 4 are made of materials resistant to seawater corrosion. The cylinder blocks 3a, 4a are preferably made of duplex stainless steel or glass fiber reinforced plastics composite material. The piston and the piston rods 3b, 4b are preferably made of duplex stainless steel or corrosion resistant copper alloy material.

The hydraulic accumulator 25 provided in the high-pressure raw seawater pipeline 28 can absorb any possible pressure impact and fluctuation in the high-pressure raw seawater pipeline 28, so as to protect the reverse osmosis membrane module. The hydraulic accumulator 25 is made of a material resistant to seawater corrosion, and preferably a bag type accumulator.

Further, the system control unit is composed of the controller 16, the hydraulic pressure sensors 14f, 15f provided in a hydraulic circuit, the hydraulic pressure sensor 26 provided in the high-pressure raw seawater pipeline 28, and the plurality of piston position sensors 17, 18, 19, 20, 21, 22, 23, 24 provided in the piston rod round stroke, wherein the piston position sensor 17, 18, 19, 20 are provided in a piston rod round stroke between the first hydraulic cylinder 1 and the first seawater cylinder 3 of the first working combined body; the sensors 17, 18 are located on one end of the first seawater cylinder 3 and arranged separately, and the sensor 17 is adjacent to the first seawater cylinder 3; the sensors 19, 20 are located on one end of the first hydraulic cylinder 1 and arranged separately and the sensor 20 is adjacent to the first hydraulic cylinder 1; thus during the back and forth motion of the piston rod of the first working combined body, the sensors 18, 19 can send an early warning signal indicating that the piston position approaches the end point, and the sensors 17, 20 can send an alternatively interchange signal indicating that the piston position reaches the end point. Similarly, the piston position sensors 21, 22, 23, 24 are provided in a piston rod round stroke between the second hydraulic cylinder 3 and the second seawater cylinder 4 of the second working combined body; the sensors 21, 22 are located on one end of the second seawater cylinder 4 and arranged separately, and the sensor 21 is adjacent to the second seawater cylinder 4; the sensors 23, 24 are located on one end of the second hydraulic cylinder 2 and arranged separately, and the sensor 24 is adjacent to the second hydraulic cylinder 2; thus during the back and forth motion of the piston rod of the second working combined body, the sensors 22, 23 can send an early warning signal indicating that the piston position approaches the end point, and the sensors 21, 24 can send an alternatively interchange signal indicating that the piston position reaches the end point. The controller 16 controls the output flow and pressure of the hydraulic pump in each hydraulic power unit, and actions of the electromagnets of the forward stroke direction control valve 13, the return stroke direction control valve 12 and the energy recovery direction control valve 11, according to the signals of each pressure sensors and position sensors.

The control unit implements the following basic process control: the system control unit adjusts the output pressure and flow of the forward stroke hydraulic power unit 15 according to a system load requirement; the output high-pressure hydraulic oil enters the forward stroke chamber 1c of the first hydraulic cylinder through the forward stroke direction control valve 13, and drives the piston rod 1b of the first hydraulic cylinder 1 to pressurize the piston and the piston rod 3b of the first seawater cylinder 3. Meanwhile, the high-pressure condensed brine pipeline 30 enters the energy recovery chamber 3d of the first seawater cylinder 3 through the energy recovery direction control valve 11, and also pressurizes the piston of the first seawater cylinder 3. The high-pressure hydraulic driving force and the pressure of the high-pressure condensed brine add up with each other and together drive the piston of the first seawater cylinder to move leftwards, so as to increase the pressure of the raw seawater in the pressurizing chamber $3c$ of the first seawater cylinder 3, and compel the raw seawater into the high-pressure raw seawater pipeline 28 through the input check valve 7 so that it enters the reverse osmosis membrane module. At the same time, the low-pressure hydraulic oil output from the return stroke hydraulic power unit 14 enters the second hydraulic cylinder 2 through the return stroke direction control valve 12; the system control unit adjusts the pressure and flow of the return stroke hydraulic power unit 14 and drives the piston of the second hydraulic cylinder 2 to return rightwards quickly, thereby moving the piston of the second seawater cylinder 4 rightwards; the pressurizing chamber $4c$ of the second seawater cylinder 4 sucks the raw seawater through the output check valve 10; the energy recovery chamber $4d$ of the second seawater cylinder 4 discharges the condensed brine after working through the energy recovery direction control valve 11, and simultaneously discharges the hydraulic oil after working in the forward stroke chamber $2c$ of the second hydraulic cylinder through the forward stroke direction control valve 13; the piston of the second hydraulic cylinder 2 returns to the start point of the second hydraulic cylinder 2 before the piston of the first hydraulic cylinder 1 reaches the working end point; when the working stroke of the first hydraulic cylinder 1 reaches the end point, the system control unit instructs the return stroke direction control valve 12, the forward stroke direction control valve 13 and the energy recovery direction control valve 11 to change positions, and the second hydraulic cylinder 2 and the second seawater cylinder 4 to interchange working mechanisms with the first hydraulic cylinder 1 and the first seawater cylinder 3. These actions circulate and repeat to complete the works of pressurization and energy recovery required for seawater desalination.

Since the system is in a pressure loss state during the switching, the flow and pressure of the high-pressure raw seawater entering the reverse osmosis membrane module fluctuate largely, and fatigue damages are easily caused to the pipeline and the module. Thus, the present invention connects a hydraulic accumulator 25 to an output end of the high-pressure raw seawater to control the pressure fluctuation within certain amplitude, thereby reducing the fluctuation and impact of the flow and pressure, and protecting the reverse osmosis membrane module. In addition, the present invention also sets the neutral position transition mechanism in each valve and the constant flow control mode in the system control unit, so as to further reduce the flow and pressure fluctuation of the high-pressure raw seawater.

In the system, the forward stroke direction control valve, the return stroke direction control valve and the energy recovery direction control valve are all provided with the neutral position transition mechanism, and the return speed of the hydraulic cylinder is made to be higher than the forward speed by adjusting the return control power system. Thus, during the switching, the process control valve can distribute the high-pressure hydraulic oil to the forward stroke chambers of the first hydraulic cylinder and the second hydraulic cylinder simultaneously, and cause the flow entering the forward stroke chamber of the first hydraulic cylinder to gradually decrease, while the flow entering the forward stroke chamber of the second hydraulic cylinder to gradually increase. The energy recovery direction control valve causes the flow of the high-pressure condensed brine entering the energy recovery chamber of the first working combined body to gradually decrease, and the flow of the high-pressure condensed brine entering the energy recovery chamber of the second working combined body to gradually increase. As a result, the flow of the high-pressure raw seawater output from the seawater pressurizing cylinder of the second working combined body gradually increases while the flow of the high-pressure raw seawater output from the seawater pressurizing cylinder of the first working combined body gradually decreases, and the sum of the flows of the high-pressure raw seawater flowing out of the pressurizing chambers of the first working combined body and the second working combined body is constant, so as to achieve a continuous and stable output of the high-pressure raw seawater to the reverse osmosis membrane module.

Figure 3:
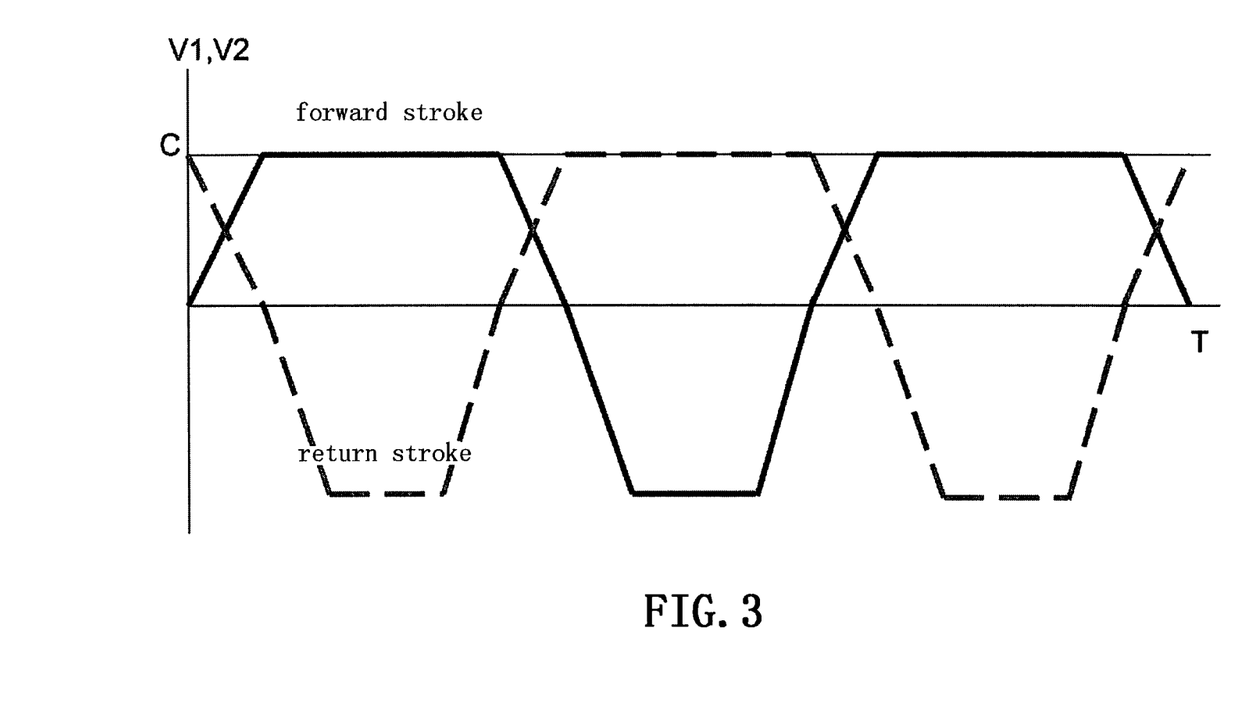
FIG. 3 is a high-pressure seawater flow-time diagram of two seawater cylinders having a constant high pressure flow function according to the present invention.

The working process of the system having the constant flow function is as follows:

The system control unit adjusts the output pressure and flow of the forward stroke hydraulic power unit 15 according to a system load requirement; the output high-pressure hydraulic oil enters the forward stroke chamber $1c$ of the first hydraulic cylinder through the forward stroke direction control valve 13, and drives the piston rod $1b$ of the first hydraulic cylinder 1 to pressurize the piston and the piston rod $3b$ of the first seawater cylinder 3. Meanwhile, the high-pressure condensed brine pipeline 30 enters the energy recovery chamber $3d$ of the first seawater cylinder 3 through the energy recovery direction control valve 11, and also pressurizes the piston of the first seawater cylinder 3. The high-pressure hydraulic driving force and the pressure of the high-pressure condensed brine add up with each other and together drive the piston of the first seawater cylinder to move leftwards, so as to increase the pressure of the raw seawater in the pressurizing chamber $3c$ of the first seawater cylinder 3, and compel the raw seawater into the high-pressure raw seawater pipeline 28 through the input check valve 7 so that it enters the reverse osmosis membrane module. At the same time, the low-pressure hydraulic oil output from the return stroke hydraulic power unit 14 enters the second hydraulic cylinder 2 through the return stroke direction control valve 12; the system control unit adjusts the pressure and flow of the return stroke hydraulic power unit 14 and drives the piston of the second hydraulic cylinder 2 to return rightwards quickly, thereby moving the piston of the second seawater cylinder 4 rightwards; the pressurizing chamber $4c$ of the second seawater cylinder 4 sucks the raw seawater through the output check valve 10; the energy recovery chamber $4d$ of the second seawater cylinder 4 discharges the condensed brine after working through the energy recovery direction control valve 11, and simultaneously discharges the hydraulic oil after working in the forward stroke chamber $2c$ of the second hydraulic cylinder through the forward stroke direction control valve 13; the piston of the second hydraulic cylinder 2 returns to the start point (determined by the position sensor 24) of the second hydraulic cylinder 2 before the piston of the first hydraulic cylinder 1 reaches the working end point (determined by the position sensor 18); the system control unit instructs the return stroke direction control valve 12 to enter the neutral position; the forward stroke direction control valve 13 also gradually switches to the neutral position, distributes the high-pressure hydraulic oil to the first hydraulic cylinder 1 and the second hydraulic cylinder 2 simultaneously, and causes the flow entering the forward stroke chamber $1c$ of the first hydraulic cylinder 1 to gradually decrease, the flow entering the forward stroke chamber $2c$ of the second hydraulic cylinder 2 to gradually increase, and the sum of the flow entering the forward stroke chamber $1c$ of the first hydraulic cylinder and the flow entering the forward stroke chamber 2c of the second hydraulic cylinder to be constant. Correspondingly, the energy recovery direction control valve 11 also switches to the neutral position to cause the flow of the high-pressure condensed brine entering the energy recovery chamber 3d of the first seawater cylinder 3 to gradually decrease, and the flow of the high-pressure condensed brine entering the energy recovery chamber 4d of the second seawater cylinder 4 to gradually increase, thereby ensuring that the flow of the high-pressure raw seawater output from the seawater pressurizing chamber 4c of the second seawater cylinder 4 gradually increases while the flow of the high-pressure raw seawater output from the seawater pressurizing chamber 3c of the first seawater cylinder 3 gradually decreases, and the sum of the flows of the high-pressure raw seawater flowing out of them is constant (as illustrated in FIG. 3), so as to achieve a continuous and stable output of the high-pressure raw seawater to the reverse osmosis membrane module. When the working stroke of the first hydraulic cylinder 1 reaches the end point (determined by the signal of the position sensor 17), the system control unit instructs the return stroke direction control valve 12, the forward stroke direction control valve 13 and the energy recovery direction control valve 11 to change positions, and the second hydraulic cylinder 2 and the second seawater cylinder 4 to interchange the working mechanisms with the first hydraulic cylinder 1 and the first seawater cylinder 3. These actions circulate and repeat to complete the works of pressurization and energy recovery required for seawater desalination.

As described above, the present invention simultaneously achieves the three functions of the high-pressure seawater pump, the energy recovery device and the booster device through a pair of hydraulic and seawater piston cylinders, supplements the energy required for seawater desalination through a hydraulic drive, and recovers the pressure energy through a liquid-liquid exchange. As compared with the most advanced seawater desalination system at present which is composed of a high-pressure seawater pump, a pressure exchange energy recovery device and a booster pump, the present invention structurally reserves the pressure exchange energy recovery device and enables it to pressurize all the raw seawater, and replaces the system which is composed of a high-pressure seawater pump and a seawater booster pump with a hydraulic system which is composed of a high-pressure hydraulic pump and a hydraulic cylinder.

According to the basic principle of the present structure, various extensions or simplifications may be performed. For example, since the piston rod of the seawater cylinder is thick, a hole may be axially opened in the end of the piston rod of the seawater cylinder, and the cylinder block of the hydraulic cylinder may be fixedly embedded into the hole to connect the piston rod of the seawater cylinder. Such a structure not only further reduces the structural space size, but also increases the coaxiality. For another example, the two combined bodies may be increased to more combined bodies which are arranged horizontally or vertically; a plurality of hydraulic pumps may be connected in parallel to expand the single machine capacity; the hydraulic pump may use different structural and variable forms; the coupler may be a rigid connector or an elastic connector with compensable installation error; the electro-hydraulic control valve may be simplified as a solenoid control valve in a case of small capacity; and a system may be simplified by cancelling the neutral position transition mechanism of each valve to stabilize the flow and the pressure only through the hydraulic accumulator.

The above descriptions are just exemplary embodiments of the present invention, rather than limitations to the scope of the present invention. Any equivalent change and modification made by a person skilled in the art without deviating from the conception and the principle of the present invention shall fall within the protection scope of the present invention.

The invention claimed is:

1. A membrane seawater desalination pressurization and energy recovery integrated device, comprising a first hydraulic cylinder, a second hydraulic cylinder, a first seawater cylinder and a second seawater cylinder which are all single-rod piston cylinders; the first hydraulic cylinder is connected to a piston rod of the first seawater cylinder to form a first working combined body; the second hydraulic cylinder is connected to a piston rod of the second seawater cylinder to form a second working combined body; rod-less chambers of the first hydraulic cylinder and the second hydraulic cylinder are connected to a forward stroke hydraulic power unit through a forward stroke direction control valve; rod chambers of the first hydraulic cylinder and the second hydraulic cylinder are connected to a return stroke hydraulic power unit through a return stroke direction control valve; rod chambers of the first seawater cylinder and the second seawater cylinder are connected to a high-pressure condensed brine pipeline or a low-pressure condensed brine pipeline through an energy recovery direction control valve; the rod-less chambers of the first seawater cylinder and the second seawater cylinder are connected to a high-pressure raw seawater pipeline through an input check valve, respectively, and connected to raw seawater supply pipeline through an output check valve, respectively; the high-pressure raw seawater pipeline is provided with a hydraulic accumulator; the pressurization and energy recovery integrated device further comprises a system control unit at least composed of a controller, a hydraulic pressure sensor provided in a hydraulic circuit, a water pressure sensor provided in the high-pressure raw seawater pipeline, and a plurality of piston position sensors; the control unit controls the switching and coordination between the forward stroke direction control valve, the return stroke direction control valve and the energy recovery direction control valve according to a system load requirement, position signals provided by the piston rod position sensors and signals from respective pressure sensors; the forward stroke direction control valve and the return stroke direction control valve act in coordination with each other to control the first working combined body and the second working combined body in a moving state where a forward stroke that the piston rods of the hydraulic cylinders protrude outwards relative to the cylinder blocks and a return stroke that the piston rods of the hydraulic cylinders retract inwards relative to the cylinder blocks are crossed and alternate; the energy recovery direction control valve controls the energy recovery chamber of the seawater cylinder in the forward stroke to be communicated with the high-pressure condensed brine pipeline, and the energy recovery chamber of the seawater cylinder in the return stroke to be communicated with the low-pressure condensed brine pipeline; and the controller controls pressures and flows output from the forward stroke hydraulic power unit and the return stroke hydraulic power unit, so as to achieve a given amount of freshwater production; the rod-less chambers of the two hydraulic cylinders are a first forward stroke chamber and a second forward stroke chamber, respectively; the rod chambers of the two hydraulic cylinders are a first return stroke chamber and a second return stroke chamber, respectively; the rod-less chambers of the two seawater cylinders are a first pressurizing chamber and a second pressurizing chamber, respectively; the rod chambers of the two seawater cylinders are a first energy recovery chamber and a second energy recovery chamber, respectively; a ratio of cross-sectional areas of the energy recovery chambers of the seawater cylinders to cross-sectional areas of the pressurizing chambers is 1-k; a ratio of cross-sectional areas of the forward stroke chambers of the hydraulic cylinders to cross-sectional areas of the pressurizing chambers of the seawater cylinders is $ko \times k \times Ps/Ph$; wherein Ps is a pressure required for the normal work of the reverse osmosis membrane, Ph is an output oil pressure of the hydraulic power unit, ko is a safety coefficient larger than 1, and k is a freshwater produce rate of a seawater desalination reverse osmosis membrane system.

2. The membrane seawater desalination pressurization and energy recovery integrated device according to claim 1, wherein the piston rod of the first hydraulic cylinder is connected to the piston rod of the first seawater cylinder to form the first working combined body; and the piston rod of the second hydraulic cylinder is connected to the piston rod of the second seawater cylinder to form the second working combined body.

3. The membrane seawater desalination pressurization and energy recovery integrated device according to claim 1, wherein the forward stroke direction control valve is a two-position four-way direction valve or a three-position four-way direction valve, which is electromagnetically controlled or electro-hydraulically controlled; an oil inlet of the forward stroke direction control valve is connected to an oil outlet of the forward stroke hydraulic power unit; an oil return port of the forward stroke direction control valve is connected to an oil return port of the forward stroke hydraulic power unit; two working oil ports of the forward stroke direction control valve are connected to the forward stroke chambers of the first hydraulic cylinder and the second hydraulic cylinder, respectively.

4. The membrane seawater desalination pressurization and energy recovery integrated device according to claim 1, wherein the return stroke direction control valve is a two-position four-way direction valve or a three-position four-way direction valve, which is electromagnetically controlled or electro-hydraulically controlled; an oil inlet of the return stroke direction control valve is connected to an oil outlet of the return stroke hydraulic power unit; an oil return port of the return stroke direction control valve is connected to an oil return port of the return stroke hydraulic power unit; two working oil ports of the return stroke direction control valve are connected to the return stroke chambers of the first hydraulic cylinder and the second hydraulic cylinder, respectively.

5. The membrane seawater desalination pressurization and energy recovery integrated device according to claim 1, wherein the energy recovery direction control valve is a two-position four-way seawater distribution valve or a three-position four-way seawater distribution valve, which is electromagnetically controlled or electro-hydraulically controlled; a fluid inlet of the energy recovery direction control valve is connected to a high-pressure condensed brine pipeline from a reverse osmosis membrane module; a fluid return port of the energy recovery direction control valve is connected to a low-pressure condensed brine pipeline of the system; two working fluid ports of the energy recovery direction control valve are connected to the energy recovery chambers of the first seawater cylinder and the second seawater cylinder, respectively; the energy recovery direction control valve controls the energy recovery chamber of the seawater cylinder in a forward stroke to be communicated with the high-pressure condensed brine pipeline, and the energy recovery chamber of the seawater cylinder in a return stroke to be communicated with the low-pressure condensed brine pipeline of the system.

6. The membrane seawater desalination pressurization and energy recovery integrated device according to claim 5, wherein each of the forward stroke direction control valve, the return stroke direction control valve and the energy recovery direction control valve is a slide valve, a rotary valve or a logical control valve group composed of a plurality of cartridge valves.

7. The membrane seawater desalination pressurization and energy recovery integrated device according to claim 5, wherein each of the forward stroke direction control valve, the return stroke direction control valve and the energy recovery direction control valve has a direction-change buffering function and a neutral position transition mechanism.

8. The membrane seawater desalination pressurization and energy recovery integrated device according to claim 1, wherein the forward stroke hydraulic power unit is composed of a prime mover, a high-pressure hydraulic pump and an auxiliary device; and the forward stroke hydraulic power unit provides a high-pressure hydraulic power oil source to the first hydraulic cylinder and the second hydraulic cylinder, and drives the piston rod to perform a forward motion that protrudes outwards.

9. The membrane seawater desalination pressurization and energy recovery integrated device according to claim 1, wherein the return stroke hydraulic power unit is composed of a prime mover, a low-pressure hydraulic pump and an auxiliary device; and the return stroke hydraulic power unit provides a low-pressure hydraulic power oil source to the first hydraulic cylinder and the second hydraulic cylinder, and drives the piston rod to perform a return motion that retracts inwards.

10. The membrane seawater desalination pressurization and energy recovery integrated device according to claim 9, wherein the auxiliary device in the hydraulic power unit comprises a hydraulic oil tank, a cooler, a filter, a pressure adjustable electric control overflow valve, a hydraulic accumulator, a pressure sensor or a pressure gage, a temperature sensor or a temperature gauge, a liquid level sensor or a liquid level indicator, a connection pipeline and a valve.

11. The membrane seawater desalination pressurization and energy recovery integrated device according to claim 1, wherein the first hydraulic cylinder and the second hydraulic cylinder are provided with a mechanical or electric control buffer device.

12. The membrane seawater desalination pressurization and energy recovery integrated device according to claim 1, wherein the cylinder blocks, the pistons, and the piston rods of the first seawater cylinder and the second seawater cylinder are made of materials resistant to seawater corrosion; the cylinder blocks are made of duplex stainless steel or glass fiber reinforced plastics composite material; the piston and the piston rod are made of duplex stainless steel or corrosion resistant copper alloy material.

13. The membrane seawater desalination pressurization and energy recovery integrated device according to claim 2, wherein the control unit implements the following basic process control: the system control unit adjusts an output pressure and flow of the forward stroke hydraulic power unit according to the system load requirement; the output high-pressure hydraulic oil enters the forward stroke chamber of the first hydraulic cylinder through the forward stroke direction control valve, and drives the piston rod of the first hydraulic cylinder to pressurize the piston and the piston rod of the first seawater cylinder; meanwhile, the high-pressure condensed brine pipeline enters the energy recovery chamber of the first seawater cylinder through the energy recovery direction control valve, and also pressurizes the piston of the first seawater cylinder; a high-pressure hydraulic driving force and a pressure of the high-pressure condensed brine add up with each other and together drive the piston of the first seawater cylinder to move, so as to increase the pressure of the raw seawater in the pressurizing chamber of the first seawater cylinder, and compel the raw seawater into the high-pressure raw seawater pipeline through the input check valve so that it enters a reverse osmosis membrane module; at the same time, the low-pressure hydraulic oil output from the return stroke hydraulic power unit enters the second hydraulic cylinder through the return stroke direction control valve; the system control unit adjusts the pressure and flow of the return stroke hydraulic power unit and drives the piston of the second hydraulic cylinder to return quickly, thereby moving the piston of the second seawater cylinder; the pressurizing chamber of the second seawater cylinder sucks the raw seawater through the output check valve; the energy recovery chamber of the second seawater cylinder discharges the condensed brine after working through the energy recovery direction control valve, and simultaneously discharges the hydraulic oil after working in the forward stroke chamber of the second hydraulic cylinder through the forward stroke direction control valve; the piston of the second hydraulic cylinder returns to a start point of the second hydraulic cylinder before the piston of the first hydraulic cylinder reaches a working end point; when the working stroke of the first hydraulic cylinder reaches the end point, the system control unit instructs the return stroke direction control valve, the forward stroke direction control valve and the energy recovery direction control valve to change positions, and the second hydraulic cylinder and the second seawater cylinder to interchange working mechanisms with the first hydraulic cylinder and the first seawater cylinder; it circulates to complete the works of pressurization and energy recovery required for seawater desalination.

14. The membrane seawater desalination pressurization and energy recovery integrated device according to claim 7, wherein the control unit implements the following constant high pressure flow process control: the system control unit adjusts an output pressure and flow of the forward stroke hydraulic power unit according to the system load requirement; the output high-pressure hydraulic oil enters the forward stroke chamber of the first hydraulic cylinder through the forward stroke direction control valve, and drives the piston rod of the first hydraulic cylinder to pressurize the piston and the piston rod of the first seawater cylinder; meanwhile, the high-pressure condensed brine pipeline enters the energy recovery chamber of the first seawater cylinder through the energy recovery direction control valve, and also pressurizes the piston of the first seawater cylinder; a high-pressure hydraulic driving force and a pressure of the high-pressure condensed brine add up with each other and together drive the piston of the first seawater cylinder to move forwards, so as to increase the pressure of the raw seawater in the pressurizing chamber of the first seawater cylinder, and compel the raw seawater into the high-pressure raw seawater pipeline through the input check valve so that it enters a reverse osmosis membrane module; at the same time, the low-pressure hydraulic oil output from the return stroke hydraulic power unit enters the second hydraulic cylinder through the return stroke direction control valve; the system control unit adjusts the pressure and flow of the return stroke hydraulic power unit and drives the piston of the second hydraulic cylinder to return backwards quickly, thereby moving the piston of the second seawater cylinder backwards; the pressurizing chamber of the second seawater cylinder sucks the raw seawater through the output check valve; the energy recovery chamber of the second seawater cylinder discharges the condensed brine after working through the energy recovery direction control valve, and simultaneously discharges the hydraulic oil after working in the forward stroke chamber of the second hydraulic cylinder through the forward stroke direction control valve; the piston of the second hydraulic cylinder returns to a start point of the second hydraulic cylinder before the piston of the first hydraulic cylinder reaches a working end point; the system control unit instructs the return stroke direction control valve to enter a neutral position; the forward stroke direction control valve also synchronously switches to the neutral position, distributes the high-pressure hydraulic oil to the first hydraulic cylinder and the second hydraulic cylinder simultaneously, and causes the flow entering the forward stroke chamber of the first hydraulic cylinder to gradually decrease, the flow entering the forward stroke chamber of the second hydraulic cylinder to gradually increase, and the sum of the flow entering the forward stroke chamber of the first hydraulic cylinder and the flow entering the forward stroke chamber of the second hydraulic cylinder to be constant; correspondingly, the energy recovery direction control valve also switches to the neutral position to cause the flow of the high-pressure condensed brine entering the energy recovery chamber of the first seawater cylinder to gradually decrease, and the flow of the high-pressure condensed brine entering the energy recovery chamber of the second seawater cylinder to gradually increase; thus under the hydraulic pressure and the pressure of the recovered high-pressure condensed brine, the two working combined bodies ensure that the flow of the high-pressure raw seawater output from the seawater pressurizing chamber of the second seawater cylinder gradually increases while the flow of the high-pressure raw seawater output from the seawater pressurizing chamber of the first seawater cylinder gradually decreases, and the sum of the flows of the high-pressure raw seawater flowing out of them is constant, so as to achieve a continuous and stable output of the high-pressure raw seawater to a reverse osmosis membrane module; when a working stroke of the first hydraulic cylinder reaches an end point, the system control unit instructs the return stroke direction control valve, the forward stroke direction control valve and the energy recovery direction control valve to change positions, and the second hydraulic cylinder and the second seawater cylinder to interchange the working mechanisms with the first hydraulic cylinder and the first seawater cylinder; and it circulates to complete the works of pressurization and energy recovery required for seawater desalination.

* * * * *